US009038743B2

(12) United States Patent
Aoki

(10) Patent No.: US 9,038,743 B2
(45) Date of Patent: May 26, 2015

(54) ELECTRIC TOOL

(75) Inventor: Yonosuke Aoki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 617 days.

(21) Appl. No.: 13/259,766

(22) PCT Filed: Mar. 19, 2010

(86) PCT No.: PCT/JP2010/054876
§ 371 (c)(1),
(2), (4) Date: Nov. 21, 2011

(87) PCT Pub. No.: WO2010/110225
PCT Pub. Date: Sep. 30, 2010

(65) Prior Publication Data
US 2012/0061116 A1 Mar. 15, 2012

(30) Foreign Application Priority Data
Mar. 24, 2009 (JP) ................ 2009-072299

(51) Int. Cl.
*B23Q 5/00* (2006.01)
*B25F 5/00* (2006.01)
(Continued)

(52) U.S. Cl.
CPC ............ *B25F 5/001* (2013.01); *B23D 47/12* (2013.01); *B23Q 11/04* (2013.01); *B24B 23/02* (2013.01); *B24B 47/26* (2013.01); *B24B 49/16* (2013.01); *B25D 11/005* (2013.01);
(Continued)

(58) Field of Classification Search
CPC ............ B21J 7/20; B21J 7/32; B23B 45/008; E21B 3/00; E21B 11/005
USPC ............... 173/217, 176, 178, 1, 2, 4; 475/265
See application file for complete search history.

(56) References Cited

U.S. PATENT DOCUMENTS 5,401,124 A  3/1995 Hettich
5,502,883 A  4/1996 Ohmi et al.
(Continued)

FOREIGN PATENT DOCUMENTS

CN  101058153 A  10/2007
EP  1 398 119 A1  3/2004
(Continued)

OTHER PUBLICATIONS

Oct. 27, 2011 International Preliminary Report on Patentability issued in International Patent Application No. PCT/JP2010/054876 (with translation).
(Continued)

*Primary Examiner* — Stephen F Gerrity
*Assistant Examiner* — Eyamindae Jallow
(74) *Attorney, Agent, or Firm* — Oliff PLC

(57) ABSTRACT

A hand-held power tool has a tool body, a motor housed in the tool body and a grip part designed to be held by a user, and performs a predetermined operation on a workpiece by a tool bit rotationally driven by the motor. The power tool includes a clutch that transmits torque and interrupts torque transmission between the motor and the tool bit, a non-contact torque sensor that detects torque acting on the tool bit in non-contact with a rotation axis rotating together with the tool bit, and a clutch control system that controls coupling and decoupling of the clutch according to a torque value detected by the non-contact torque sensor.

11 Claims, 2 Drawing Sheets

(51) Int. Cl.

| | |
|---|---|
| *B23D 47/12* | (2006.01) |
| *B23Q 11/04* | (2006.01) |
| *B24B 23/02* | (2006.01) |
| *B24B 47/26* | (2006.01) |
| *B24B 49/16* | (2006.01) |
| *B25D 11/00* | (2006.01) |
| *B25D 16/00* | (2006.01) |
| *B25B 21/00* | (2006.01) |
| *B25B 23/14* | (2006.01) |
| *B25B 23/147* | (2006.01) |

(52) U.S. Cl.
CPC ....... B25D 16/003 (2013.01); *B25D 2211/003* (2013.01); *B25D 2250/145* (2013.01); *B25D 2250/165* (2013.01); *B25D 2250/221* (2013.01); B25B 21/00 (2013.01); B25B 23/14 (2013.01); B25B 23/1405 (2013.01); B25B 23/141 (2013.01); B25B 23/1475 (2013.01)

(56) References Cited

U.S. PATENT DOCUMENTS

| | | | | |
|---|---|---|---|---|
| 5,879,111 | A | 3/1999 | Stock et al. | |
| 6,111,515 | A | 8/2000 | Schaer et al. | |
| 6,318,189 | B1* | 11/2001 | Donaldson | 73/862.335 |
| 6,415,875 | B1 | 7/2002 | Meixner et al. | |
| 7,311,027 | B1* | 12/2007 | Tatsuno et al. | 81/469 |
| 7,328,752 | B2* | 2/2008 | Gass et al. | 173/2 |
| 7,360,607 | B2* | 4/2008 | Aeberhard | 173/176 |
| 7,506,694 | B2* | 3/2009 | Stirm et al. | 173/178 |
| 7,513,845 | B2* | 4/2009 | Ho | 475/298 |
| 7,987,919 | B2* | 8/2011 | Paprocki | 173/2 |
| 8,047,057 | B2* | 11/2011 | Chen | 73/48 |
| 8,316,958 | B2* | 11/2012 | Schell et al. | 173/178 |
| 8,561,717 | B2* | 10/2013 | Pozgay et al. | 173/217 |
| 2002/0037785 | A1 | 3/2002 | Wissmach et al. | |
| 2003/0221928 | A1 | 12/2003 | Koslowski | |
| 2004/0226728 | A1 | 11/2004 | Boeni et al. | |
| 2005/0139445 | A1* | 6/2005 | Bosk | 192/66.2 |
| 2006/0124331 | A1* | 6/2006 | Stirm et al. | 173/178 |
| 2007/0034394 | A1* | 2/2007 | Gass et al. | 173/2 |
| 2007/0044983 | A1* | 3/2007 | Wuensch et al. | 173/217 |
| 2007/0074883 | A1 | 4/2007 | Strasser et al. | |
| 2008/0264692 | A1* | 10/2008 | Underwood et al. | 175/106 |
| 2009/0294145 | A1* | 12/2009 | Satou et al. | 173/178 |
| 2010/0200260 | A1* | 8/2010 | Mikami et al. | 173/176 |

FOREIGN PATENT DOCUMENTS

| | | |
|---|---|---|
| EP | 1 870 209 A1 | 12/2007 |
| GB | 2 378 488 A | 2/2003 |
| JP | A-02-100881 | 4/1990 |
| JP | U-3-113777 | 11/1991 |
| JP | A-6-506400 | 7/1994 |
| JP | A-07-052063 | 2/1995 |
| JP | H08-001536 | 1/1996 |
| JP | A-08-267368 | 10/1996 |
| JP | A-2000-263304 | 9/2000 |
| JP | A-2002-156010 | 5/2002 |
| JP | A-2003-62768 | 3/2003 |
| JP | A-2007-529327 | 10/2007 |
| WO | WO 2006/020571 A1 | 2/2006 |

OTHER PUBLICATIONS

International Search Report mailed Apr. 20, 2010 in International Patent Application No. PCT/JP2010/054876 (with translation).
Sep. 13, 2013 Supplementary European Search Report issued in European Application No. 10756022.9.
Dec. 2, 2013 Office Action issued in Japanese Patent Application No. 2009-072299.
Apr. 10, 2014 Office Action issued in Chinese Patent Application No. 201080013095.0.

* cited by examiner

ELECTRIC TOOL

FIELD OF THE INVENTION

The present invention relates to a hand-held electric power tool which performs a predetermined operation on a workpiece by a rotationally driven tool bit, and more particularly, to a technique for reducing the possibility that a tool body is swung by unintentional locking of the tool bit.

BACKGROUND OF THE INVENTION

Japanese laid-open Patent Publication No. 2002-156010 discloses a power tool having a safety clutch using a planetary gear mechanism. In this power tool, an outer ring member in the planetary gear mechanism is pressed and held by a contact element defined by a brake shoe. When a tool bit is unintentionally locked during drilling operation, the outer ring member held by the contact element is released, so that a torque reaction force no longer acts on a tool body and the tool body is prevented from being swung.

With the safety clutch using the planetary gear mechanism, however, size reduction of the power tool is difficult.

DISCLOSURE OF THE INVENTION

Object of the Invention

Accordingly, it is an object of the present invention to realize size reduction of a mechanism for preventing a tool body from being swung when a tool bit is locked, in a power tool.

Means for Achieving the Object

The above-described problem is solved according to the present invention. A power tool according to the present invention has a tool body, a motor housed in the tool body and a grip part designed to be held by a user, and is configured as a hand-held power tool which performs a predetermined operation on a workpiece by a tool bit rotationally driven by the motor. Further, the "power tool" in this invention typically represents an electric hammer drill which performs a drilling operation on a workpiece at least by rotation of the tool bit, but it also includes a grinding/polishing tool such as an electric disk grinder which performs a grinding or polishing operation on a workpiece by rotation of the tool bit, or a rotary cutting machine such as a circular saw for cutting a workpiece.

In this invention, the power tool has a clutch that transmits torque and interrupts torque transmission between the motor and the tool bit, a non-contact torque sensor that detects torque acting on the tool bit during operation in non-contact with a rotation axis rotating together with the tool bit, and a clutch control system that controls coupling and decoupling of the clutch according to a torque value detected by the non-contact torque sensor. Further, the "non-contact torque sensor" in this invention typically represents a magnetostrictive torque sensor using a magnetostriction effect in which magnetic permeability of the rotation axis varies according to the torque, but it also includes any torque sensor which can detect torque acting on the rotation axis in non-contact therewith. The "clutch" in this invention typically represents an electromagnetic clutch which is coupled and decoupled by utilizing an electromagnetic force.

The power tool according to this invention is provided with the non-contact torque sensor that detects torque acting on the tool bit, and designed such that the clutch control system controls coupling and decoupling of the clutch according to a torque value detected by the non-contact torque sensor. Therefore, when the tool bit is unintentionally locked during operation, the clutch control system decouples the clutch according to the torque value detected by the non-contact torque sensor and interrupts torque transmission. Thus, the tool body can be prevented from being swung by a torque reaction force which acts on the tool body. Further, in this invention, by provision of the construction in which the non-contact torque sensor and the clutch are utilized as the mechanism for preventing the tool body from being swung, size reduction of the mechanism can be realized in comparison to a conventional system utilizing the planetary gear mechanism. Moreover, in this invention, by provision of the construction in which the torque of the tool bit is detected by the non-contact torque sensor, the torque value to determine timing of decoupling of the clutch can be arbitrarily and easily changed.

According to a further embodiment of the power tool of the present invention, the clutch control system interrupts torque transmission by decoupling the clutch when the torque value detected by the non-contact torque sensor exceeds a designated torque value. According to this invention, when the torque value acting on the tool bit exceeds the designated torque value due to unintentional locking of the tool bit, the clutch control system interrupts torque transmission by decoupling the clutch, so that the tool body can be avoided from being swung.

According to a further embodiment of the power tool of the present invention, the torque value which is set to determine timing of decoupling of the clutch can be changed by manual operation of the user. With such a construction, the user can arbitrarily change the torque value according to operating conditions, so that it is rational.

According to a further embodiment of the power tool of the present invention, the clutch control system interrupts torque transmission by decoupling the clutch when the clutch control system determines that the torque value detected by the non-contact torque sensor has abruptly risen. According to this invention, when the torque value acting on the tool bit rapidly rises due to unintentional locking of the tool bit, the clutch control system interrupts torque transmission by decoupling the clutch, so that the tool body can be avoided from being swung. In this case, the manner of "determining that the torque value has abruptly risen" conceivably includes the manner of monitoring a detected average torque value and determining the abrupt rise by the rate of rise with respect to the average value, and the manner of determining the abrupt rise by the rate of rise of the torque value per unit time.

According to a further embodiment of the power tool of the present invention, a mechanical torque limiter for preventing overload on the tool bit is further disposed in a torque transmission path between the motor and the tool bit. By provision of such a mechanical torque limiter, components of the torque transmission system including the tool bit and the motor can be protected from damage caused by overload.

According to a further embodiment of the power tool of the present invention, the non-contact torque sensor can be disabled. The manner in which "the non-contact torque sensor can be disabled" in this invention represents, for example, the manner in which the function of the non-contact torque sensor itself can be disabled, or the manner in which the torque value can be changed (adjusted) by the non-contact torque sensor and the adjusted torque value is set to be higher than a maximum transmission torque value of the mechanical torque limiter. With such a construction, an operation can be performed after the non-contact torque sensor is disabled as necessary.

According to a further embodiment of the power tool of the present invention, a maximum transmission torque value of the mechanical torque limiter is higher than a torque value to determine timing of decoupling of the clutch. With such a construction, when the clutch is not decoupled even though the tool bit is locked, torque transmission can be interrupted by the mechanical torque limiter.

According to a further embodiment of the power tool of the present invention, the tool bit performs a hammer drill operation on the workpiece by linear movement in its axial direction and rotation around its axis. Further, the non-contact torque sensor is disposed on an intermediate shaft located between a drive shaft driven by the motor and a final output shaft to which the tool bit is mounted. The "drive shaft" in this invention represents an output shaft of the motor and the "final output shaft" represents a tool holder which detachably holds the tool bit.

According to the present invention, in a hammer drill in which the tool bit linearly moves in its axial direction and rotates around its axis, the non-contact torque sensor is disposed on the intermediate shaft. With such a construction, a spatially or structurally rational arrangement can be provided in comparison to the construction in which the non-contact torque sensor is disposed on the drive shaft or the output shaft.

According to a further embodiment of the power tool of the present invention, a plurality of intermediate shafts are provided between the drive shaft and the final output shaft, and the non-contact torque sensor and the clutch are disposed on different intermediate shafts. With such a construction in which torque detection and torque transmission/interruption are made on different intermediate shafts, the size of the intermediate shafts can be rationally reduced in the axial direction.

Effect of the Invention

According to this invention, the above-described object can be achieved. Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to provide improved electric power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
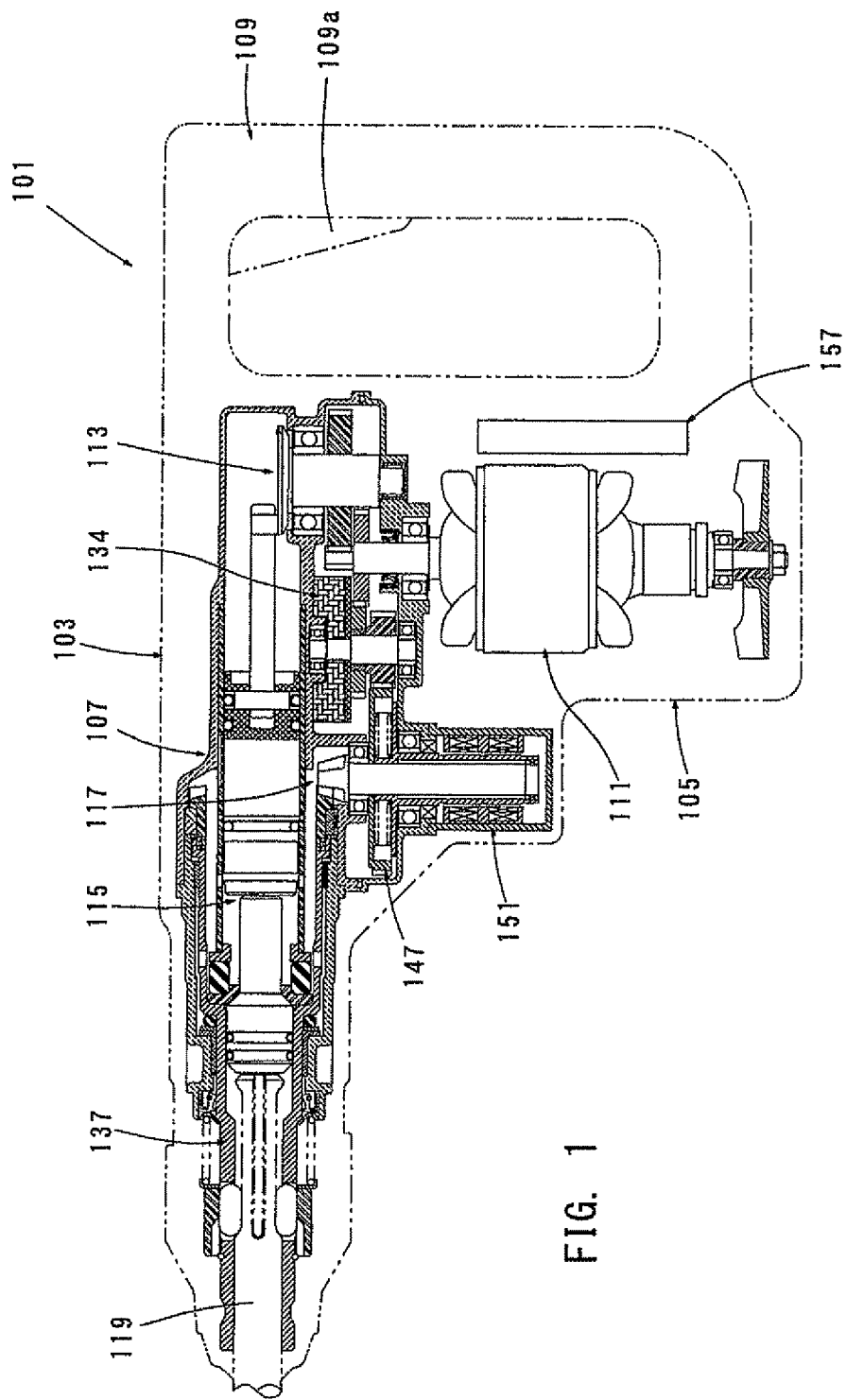
FIG. 1 is a sectional view showing an entire structure of a hammer drill according to an embodiment of the present invention.
Figure 2:
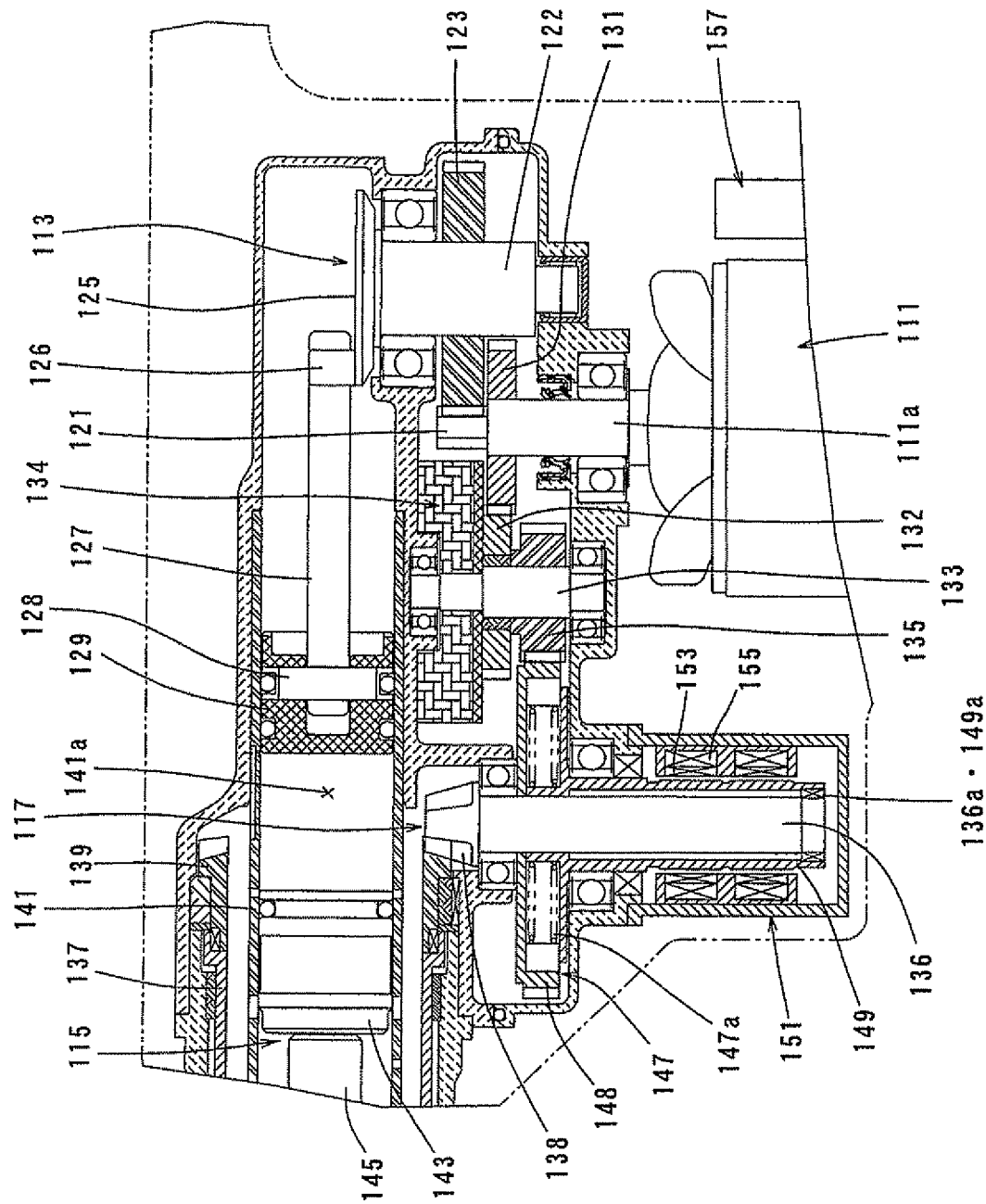
FIG. 2 is an enlarged sectional view showing an essential part of the hammer drill according to the present invention.

An embodiment of the present invention is now described with reference to FIGS. 1 and 2. In this embodiment, an electric hammer drill is explained as a representative example of the power tool. As shown in FIGS. 1 and 2, the hammer drill 101 according to this embodiment mainly includes a body 103 that forms an outer shell of the hammer drill 101, a hammer bit 119 detachably coupled to a front end region (on the left as viewed in FIG. 1) of the body 103 via a hollow tool holder 137, and a handgrip 109 designed to be held by a user and connected to the body 103 on the side opposite to the hammer bit 119. The hammer bit 119 is held by the tool holder 137 such that it is allowed to linearly move with respect to the tool holder in its axial direction. The body 103, the hammer bit 119 and the handgrip 109 are features that correspond to the "tool body", the "tool bit" and the "grip part", respectively, according to the present invention. In this embodiment, for the sake of convenience, of explanation, the side of the hammer bit 119 is taken as the front and the side of the handgrip 109 as the rear.

The body 103 includes a motor housing 105 that houses a driving motor 111, and a gear housing 107 that houses a motion converting mechanism 113, a striking mechanism 115 and a power transmitting mechanism 117. The driving motor 111 is arranged such that its rotation axis runs in a vertical direction (vertically as viewed in FIG. 1) substantially perpendicular to a longitudinal direction of the body 103 (the axial direction of the hammer bit 119). The motion converting mechanism 113 appropriately converts torque of the driving motor 111 into linear motion and then transmits it to the striking mechanism 115. Then, an impact force is generated in the axial direction of the hammer bit 119 (the horizontal direction as viewed in FIG. 1) via the striking mechanism 115. Further, the power transmitting mechanism 117 appropriately reduces the speed of torque of the driving motor 111 and transmits it to the hammer bit 119 via the tool holder 137, so that the hammer bit 119 is caused to rotate in its circumferential direction. The driving motor 111 is driven when a user depresses a trigger 109a disposed on the handgrip 109.

As shown in FIG. 2, the motion converting mechanism 113 mainly includes a first driving gear 121 that is formed on an output shaft (rotating shaft) 111a of the driving motor 111 and caused to rotate in a horizontal plane, a driven gear 123 that engages with the first driving gear 121, a crank shaft 122 to which the driven gear 123 is fixed, a crank plate 125 that is caused to rotate in a horizontal plane together with the crank shaft 122, a crank arm that is loosely connected to the crank plate 125 via an eccentric shaft 126 and a driving element in the form of a piston 129 which is mounted to the crank arm 127 via a connecting shaft 128. The output shaft 111a of the driving motor 111 and the crank shaft 122 are disposed parallel to each other. The crank shaft 122, the crank plate 125, the eccentric shaft 126, the crank arm 127 and the piston 129 form a crank mechanism. The piston 129 is slidably disposed within a cylinder 141. When the driving motor 111 is driven, the piston 129 is caused to linearly move in the axial direction of the hammer bit 119 within the cylinder 141.

The striking mechanism 115 mainly includes a striking element in the form of a striker 143 slidably disposed within the bore of the cylinder 141, and an intermediate element in the form of an impact bolt 145 that is slidably disposed within the tool holder 137 and serves to transmit kinetic energy of the striker 143 to the hammer bit 119. An air chamber 141a is formed between the piston 129 and the striker 143 in the cylinder 141. The striker 143 is driven via pressure fluctuations (air spring action) of the air chamber 141a of the cylinder 141 by sliding movement of the piston 129. The striker 143 then collides with (strikes) the impact bolt 145 which is slidably disposed in the tool holder 137. As a result, a striking force caused by the collision is transmitted to the hammer bit 119 via the impact bolt 145.

The power transmitting mechanism 117 mainly includes a second driving gear 131, a first intermediate gear 132, a first intermediate shaft 133, an electromagnetic clutch 134, a second intermediate gear 135, a second intermediate shaft 136, a mechanical torque limiter 147, a small bevel gear 138 and a large bevel gear 139. The second driving gear 131 is fixed to the output shaft 111a of the driving motor 111 and caused to rotate in the horizontal plane together with the first driving gear 121. The first and second intermediate shafts 133, 136 are disposed parallel to the output shaft 111a. The first intermediate gear 132 is mounted on the first intermediate shaft 133 such that it can rotate with respect to the first intermediate shaft, and constantly engaged with the second driving gear 131. The output shaft 111a is a feature that corresponds to the "drive shaft" according to this invention.

The electromagnetic clutch 134 is fixed on the first intermediate shaft 133 such that it is opposed to the first intermediate gear 132 in the longitudinal direction. Further, the electromagnetic clutch 134 is coupled with or decoupled from the first intermediate gear 132 by passage or interruption of current to an electromagnet under electric signals from a controller 157 which is described below. Torque of the driving motor 111 is transmitted to the first intermediate shaft 133 when the electromagnetic clutch 134 is coupled with the first intermediate gear 132, while torque transmission is interrupted when the electromagnetic clutch 134 is decoupled from the first intermediate gear 132. Further, the electromagnetic clutch 134 may be coupled with the first intermediate gear 132 by frictional force, by engagement or by using a coil spring. Further, the second intermediate gear 135 is fixed on the first intermediate shaft 133 and rotates together with the electromagnetic clutch 134. Torque of the second intermediate gear 135 is transmitted to the second intermediate shaft 136 via the mechanical torque limiter 147.

The mechanical torque limiter 147 is provided as a safety device against overload on the hammer bit 119 and interrupts torque transmission to the hammer bit 119 when an excessive torque exceeding a set value (hereinafter referred to as a maximum transmission torque value) is exerted on the hammer bit 119. The mechanical torque limiter 147 is coaxially mounted on the second intermediate shaft 136.

The mechanical torque limiter 147 includes a drive-side member 148 having a gear which is engaged with the second intermediate gear 135, and a hollow driven-side member 149 which is loosely fitted on the second intermediate shaft 136. Further, on one end portion (lower end portion as viewed in FIG. 2) of the driven-side member 149 in its longitudinal direction, teeth 149a and 136a formed in the driven-side member 149 and the second intermediate shaft 136 are engaged with each other. With such a construction, the mechanical torque limiter 147 and the second intermediate shaft 136 are caused to rotate together. Although not particularly shown, when the torque exerted on the second intermediate shaft 136 (which corresponds to the torque exerted on the hammer bit 119) is lower than or equal to the maximum transmission torque value which is predetermined by a spring 147a, torque is transmitted between the drive-side member 148 and the driven-side member 149. However, when the torque exerted on the second intermediate shaft 136 exceeds the maximum transmission torque value, torque transmission between the drive-side member 148 and the driven-side member 149 is interrupted.

Further, torque of the second intermediate shaft 136 is transmitted from a small bevel gear 138 which is integrally formed with the second intermediate shaft 136, to a large bevel gear 139 which is rotated in a vertical plane in engagement with the small bevel gear 138. Moreover, torque of the large bevel gear 139 is transmitted to the hammer bit 119 via the tool holder 137 coupled with the large bevel gear 139. The tool holder 137 is a feature that corresponds to the "final output shaft" according to this invention.

A magnetostrictive torque sensor 151 is installed in the power transmitting mechanism 117 and serves to detect torque acting on the hammer bit 119 during operation. The magnetostrictive torque sensor 151 is a feature that corresponds to the "non-contact torque sensor" according to this invention. The magnetostrictive torque sensor 151 is installed in order to detect torque acting on the driven-side member 149 of the mechanical torque limiter 147 in the power transmitting mechanism 117. The magnetostrictive torque sensor 151 has an exciting coil 153 and a detecting coil 155 around an inclined groove formed in an outer periphery of a torque detecting shaft in the form of the driven-side member 149. Change in magnetic permeability of the inclined groove of the driven-side member 149 which is caused when the driven-side member 149 is turned is detected as a voltage change by the detecting coil 155. Torque is then obtained from the detected voltage change. The driven-side member 149 is a feature that corresponds to the "rotation axis" according to this invention.

The torque detected by the magnetostrictive torque sensor 151 is outputted to a controller 157. When a detected torque value outputted from the magnetostrictive torque sensor 151 exceeds a designated torque value, the controller 157 outputs a drive signal to the electromagnetic clutch 134 to decouple the electromagnetic clutch 134 from the first intermediate gear 132. Although not shown, as for the designated torque at which the controller 157 executes decoupling of the electromagnetic clutch 134, a user can arbitrarily change (adjust) the designated torque by externally operating a means for adjusting the torque (for example, a dial) with fingers. Further, the designated torque adjusted by the torque adjusting means is limited within a range lower than the maximum transmission torque value predetermined by the spring 147a of the mechanical torque limiter 147. The controller 157 is a feature that corresponds to the "clutch controlling device" according to this invention.

In the hammer drill 101 constructed as described above, when the user holds the handgrip 109 and depresses the trigger 109a in order to drive the driving motor 111, the piston 129 is caused to linearly slide within the cylinder 141 via the motion converting mechanism 113 mainly including the crank mechanism. By this sliding movement, the striker 143 is caused to linearly move within the cylinder 141 via air pressure fluctuations or air spring action in the air chamber 141a of the cylinder 141. The striker 143 then collides with the impact bolt 145, so that the kinetic energy caused by this collision is transmitted to the hammer bit 119.

Torque of the driving motor 111 is transmitted to the tool holder 137 via the power transmitting mechanism 117. Thus, the tool holder 137 is rotationally driven in the vertical plane and the hammer bit 119 is rotated together with the tool holder 137. In this manner, the hammer bit 119 performs a hammering movement in its axial direction and a drilling movement in its circumferential direction, so that a hammer drill operation (drilling operation) is performed on a workpiece (concrete).

Further, the hammer drill 101 according to this embodiment can be switched not only to the above-described hammer drill mode in which the hammer bit 119 is caused to perform hammering movement and drilling movement in the circumferential direction, but to drill mode in which the hammer bit 119 is caused to perform only drilling movement, or hammer mode in which the hammer bit 119 is caused to perform only hammering movement. A mode switching mechanism, however, is not directly related to the present invention, and therefore its description is omitted.

During the above-described hammer drill operation, the magnetostrictive torque sensor 151 detects the torque acting on the driven-side member 149 of the mechanical torque limiter 147 and outputs it to the controller 157. When the hammer bit 119 is unintentionally locked for any cause and the torque value outputted from the magnetostrictive torque sensor 151 to the controller 157 exceeds the designated torque value set by the user in advance, the controller 157 outputs an electric signal to decouple the electromagnetic clutch 134. Therefore, current is passed to the electromagnet of the electromagnetic clutch 134 and the electromagnetic clutch 134 is decoupled from the first intermediate gear 132, so that torque transmission from the driving motor 111 to the hammer bit 119 is interrupted. Thus, the tool body can be prevented from being swung by a torque reaction force acting on the body 103 due to locking of the hammer bit 119.

As described above, according to this embodiment, the designated torque value which can be transmitted by the electromagnetic clutch 134 or at which torque transmission is interrupted can be arbitrarily set by the user, so that the designated torque value can be adjusted in use according to operating conditions. Therefore, the possibility that the tool body may be swung by unintentional locking of the hammer bit 119 can be reduced. In this case, it can be constructed such that the designated torque value of the electromagnetic clutch 134 can be adjusted within a range lower than the maximum transmission torque value of the mechanical torque limiter 137, or can be adjusted in a range including the maximum transmission torque value of the mechanical torque limiter 137.

When it is constructed such that the designated torque value of the electromagnetic clutch 134 can be adjusted in a range including the maximum transmission torque value of the mechanical torque limiter 137, the magnetostrictive torque sensor 151 can be disabled by adjusting the designated torque value of the electromagnetic clutch 134 to be higher than the maximum transmission torque value of the mechanical torque limiter 137. The disabling of the magnetostrictive torque sensor 151 may also be effected, for example, by interrupting an electrical connection between the magnetostrictive torque sensor 151 and the electromagnetic clutch 134 via a switch operation.

Further, in this embodiment, when the torque value detected by the magnetostrictive torque sensor 151 exceeds the designated torque value, the electromagnetic clutch 134 is decoupled from the first intermediate gear 132 so that torque transmission is interrupted. However, for example, it is also conceivable that the user may set the designated torque value relatively high and performs an operation in a condition of readiness for locking of the hammer bit 119. Therefore, in order to cope with such a condition, the controller 157 can be designed and constructed to execute decoupling of the electromagnetic clutch 134 from the first intermediate gear 132 when the controller 157 determines an abnormal torque rise by monitoring an average value of the torque outputted from the magnetostrictive torque sensor 151, or it determines an abnormal torque rise by the rate of rise of the torque value per unit time. With such a construction, when the hammer bit 119 is unintentionally locked, torque transmission can be reliably interrupted by the electromagnetic clutch 134. In this case, it may also be constructed such that the rate of abrupt rise of the torque can be controlled.

Further, in this embodiment, the electromagnetic clutch 134 is disposed in a torque transmission path of the hammer bit 119 or disposed in the power transmitting mechanism 117 formed independently of the motion converting mechanism 113 which serves as a power transmission path for striking movement of the hammer bit 119. With such a construction, in the hammer drill 101, the electromagnetic clutch 134 can also serve as a drive mode switching clutch when the drive mode is switched between the hammer drill mode in which the hammer bit 119 is caused to perform linear movement and rotation, and the hammer mode in which the hammer bit 119 is caused to perform only linear movement.

Further, in the hammer drill 101 of this embodiment, the magnetostrictive torque sensor 151 is disposed on an intermediate shaft in the torque transmission path of the hammer bit 119, or specifically, on the driven-side member 149 of the mechanical torque limiter 147. With such a construction, a spacially or structurally rational arrangement can be provided in comparison to the construction in which the magnetostrictive torque sensor 151 is disposed on the drive shaft in the form of the output shaft 111a of the driving motor 111 or on the final output shaft in the form of the tool holder 137.

Further, in this embodiment, the magnetostrictive torque sensor 151 is described as a representative example of the non-contact torque sensor, but the present invention is not limited to this and may also be applied to other torque sensors capable of detecting torque in non-contact with the torque detecting shaft in the form of the rotation axis.

Further, in this embodiment, the torque sensor is disposed on the driven-side member 149 of the mechanical torque limiter 147, but the torque sensor may be disposed anywhere on the torque transmission path.

Further, in this embodiment, an electric hammer drill is described as a representative example of the power tool, but the present invention can also be applied to power tools other than the electric hammer, such as an electric disk grinder for use in grinding or polishing operation, and a rotary cutting machine such as a circular saw for cutting a workpiece.

In view of the above described invention, the following aspects are provided.

Aspect 1:

"A non-contact torque sensor detects torque acting on a driven-side member of a mechanical torque limiter."

Aspect 2:

"A clutch comprises an electromagnetic clutch which serves to transmit torque and interrupt torque transmission by passage and interruption of current to an electromagnet."

Aspect 3:

"In Aspect 2, the electromagnetic clutch transmits torque of an intermediate gear to a tool bit by coupling with the intermediate gear which is engaged with a driving gear driven by a motor, and interrupts torque transmission by decoupling from the intermediate gear".

DESCRIPTION OF NUMERALS 101 hammer drill (power tool)
103 body (tool body)
105 motor housing
107 gear housing 109 handgrip (grip part)
109a trigger
111 driving motor (motor)
111a output shaft
113 motion converting mechanism
115 striking mechanism
117 power transmitting mechanism
119 hammer bit (tool bit)
121 first driving gear
122 crank shaft
123 driven gear
125 crank plate
126 eccentric shaft
127 crank arm
128 connecting shaft
129 piston (driving element)
131 second driving gear
132 first intermediate gear
133 first intermediate shaft
134 electromagnetic clutch (clutch)
135 second intermediate gear
136 second intermediate shaft
136a teeth
137 tool holder
138 small bevel gear
139 large bevel gear
141 cylinder
141a air chamber
143 striker (striking element)
145 impact bolt (intermediate element)
147 mechanical torque limiter
147a spring
148 drive-side member
149 driven-side member (rotation axis)
149a teeth
151 magnetostrictive torque sensor
153 exciting coil
155 detecting coil
157 controller (clutch control system)

I claim:

1. A hand-held power tool comprising:
a tool body,
a motor housed in the tool body,
a grip part configured to be held by a user so that a predetermined operation is configured to be performed on a workpiece by a tool bit rotationally driven by the motor,
a clutch that transmits torque and interrupts torque transmission between the motor and the tool bit,
a non-contact torque sensor that detects torque acting on the tool bit during operation, no portion of the non-contact torque sensor being in physical contact with a torque detecting shaft that rotates together with the tool bit,
a clutch control system that controls coupling and decoupling of the clutch according to a torque value detected by the non-contact torque sensor, and
a mechanical torque limiter that is configured to prevent overload on the tool bit, the mechanical torque limiter being disposed in a torque transmission path between the motor and the tool bit,
wherein a plurality of intermediate shafts are provided between a drive shaft driven by the motor and a final output shaft to which the tool bit is mounted, and the non-contact torque sensor and the clutch are disposed on different intermediate shafts.

2. The power tool as defined in claim 1, wherein the clutch control system interrupts torque transmission by decoupling the clutch when the torque value detected by the non-contact torque sensor exceeds a designated torque value.

3. The power tool as defined in claim 2, wherein the torque value which is set to determine the decoupling of the clutch is configured to be changed by manual operation of the user.

4. The power tool as defined in claim 1, wherein the clutch control system interrupts torque transmission by decoupling the clutch when the clutch control system determines that the torque value detected by the non-contact torque sensor has abruptly risen.

5. The power tool as defined in claim 1, wherein the non-contact torque sensor is configured to be disabled.

6. The power tool as defined in claim 1, wherein a maximum transmission torque value of the mechanical torque limiter is higher than a torque value to determine the decoupling of the clutch by the clutch control system.

7. The power tool as defined in claim 1, wherein:
the tool bit is configured to perform a hammer drill operation on the workpiece by linear movement in its axial direction and rotation around its axis, and
the non-contact torque sensor is disposed on the torque detecting shaft which is one of the plurality of intermediate shafts.

8. The power tool as defined in claim 1, wherein the non-contact torque sensor is a magnetostrictive torque sensor.

9. The power tool as defined in claim 1, wherein an axis of rotation of the torque detecting shaft is different from an axis of rotation of the tool bit and from an axis of rotation of the motor.

10. The power tool as defined in claim 1, wherein the non-contact torque sensor is disposed around the torque detecting shaft, the torque detecting shaft rotating together with the tool bit.

11. A hand-held power tool comprising:
a tool body,
a motor housed in the tool body,
a grip part configured to be held by a user so that a predetermined operation is configured to be performed on a workpiece by a tool bit rotationally driven by the motor,
a clutch that transmits torque and interrupts torque transmission between the motor and the tool bit,
a non-contact torque sensor that detects torque acting on the tool bit during operation, no portion of the non-contact torque sensor being in physical contact with a torque detecting shaft that rotates together with the tool bit,
a clutch control system that controls coupling and decoupling of the clutch according to a torque value detected by the non-contact torque sensor, and
a mechanical torque limiter that is configured to prevent overload on the tool bit, the mechanical torque limiter being disposed in a torque transmission path between the motor and the tool bit,
wherein an axis of rotation of the torque detecting shaft is different from an axis of rotation of the tool bit and from an axis of rotation of the motor.

\* \* \* \* \*